June 17, 1958        R. D. GRAF        2,839,034

ROTARY INTERNAL COMBUSTION ENGINE

Filed June 28, 1957        7 Sheets-Sheet 1

INVENTOR.
ROBERT D. GRAF,
BY
McMorrow, Berman + Davidson
ATTORNEYS.

June 17, 1958 R. D. GRAF 2,839,034
ROTARY INTERNAL COMBUSTION ENGINE
Filed June 28, 1957 7 Sheets-Sheet 3

INVENTOR.
ROBERT D. GRAF,
BY
McMorrow, Berman & Davidson
ATTORNEYS.

June 17, 1958 R. D. GRAF 2,839,034
ROTARY INTERNAL COMBUSTION ENGINE
Filed June 28, 1957 7 Sheets-Sheet 4

INVENTOR.
ROBERT D. GRAF,
BY
McMorrow, Berman + Davidson
ATTORNEYS.

June 17, 1958 R. D. GRAF 2,839,034
ROTARY INTERNAL COMBUSTION ENGINE
Filed June 28, 1957 7 Sheets-Sheet 5

INVENTOR.
ROBERT D. GRAF,
BY
McMorrow, Berman + Davidson
ATTORNEYS.

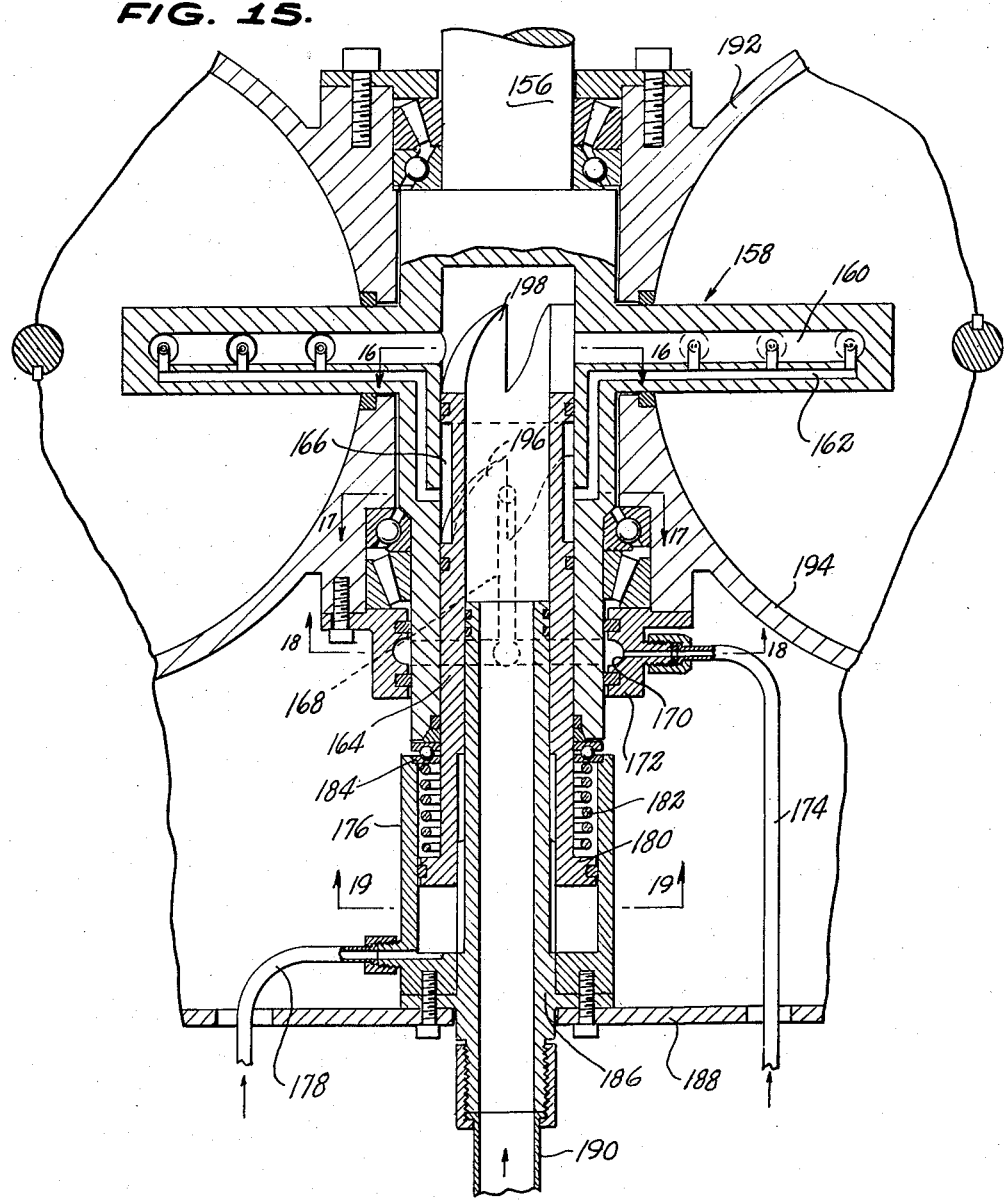

June 17, 1958 R. D. GRAF 2,839,034
ROTARY INTERNAL COMBUSTION ENGINE
Filed June 28, 1957 7 Sheets-Sheet 7

INVENTOR.
ROBERT D. GRAF,
BY
McMorrow, Berman + Davidson
ATTORNEYS.

United States Patent Office 2,839,034
Patented June 17, 1958

2,839,034

ROTARY INTERNAL COMBUSTION ENGINE

Robert Donald Graf, Paterson, N. J.

Application June 28, 1957, Serial No. 668,658

4 Claims. (Cl. 123—13)

The present invention relates to a rotary internal combustion engine.

An object of the present invention is to provide an internal combustion engine which may be operated with any one of many liquid fuels such as alcohol, diesel oil, fuel oil, gasoline, and the like.

Another object of the present invention is to provide an internal combustion engine which produces equal torque at low and high speeds and may be used as a prime mover in a vehicle without the employment of a transmission or torque converter.

A further object of the present invention is to provide a rotary internal combustion engine which lends itself to quiet efficient operation in all ranges of speed, one having no reciprocating parts to create vibration, one sturdy in construction and employing few parts, easily and economically fabricated and assembled, and one which is highly effective in action.

These and other objects and advantages of the present invention will be fully apparent from the following description when taken in connection with the annexed drawings, in which:

Figure 5 is a sectional view taken on the line 5—5 of Figure 3;

Figure 8 is an isometric exploded view of one of the valves used in the engine according to the present invention;

Figure 9 is an isometric exploded view of the rotor blade assembly;

Figure 15 is a sectional view of a modified form of a fuel and air inlet showing a fuel metering system;

Figure 1:
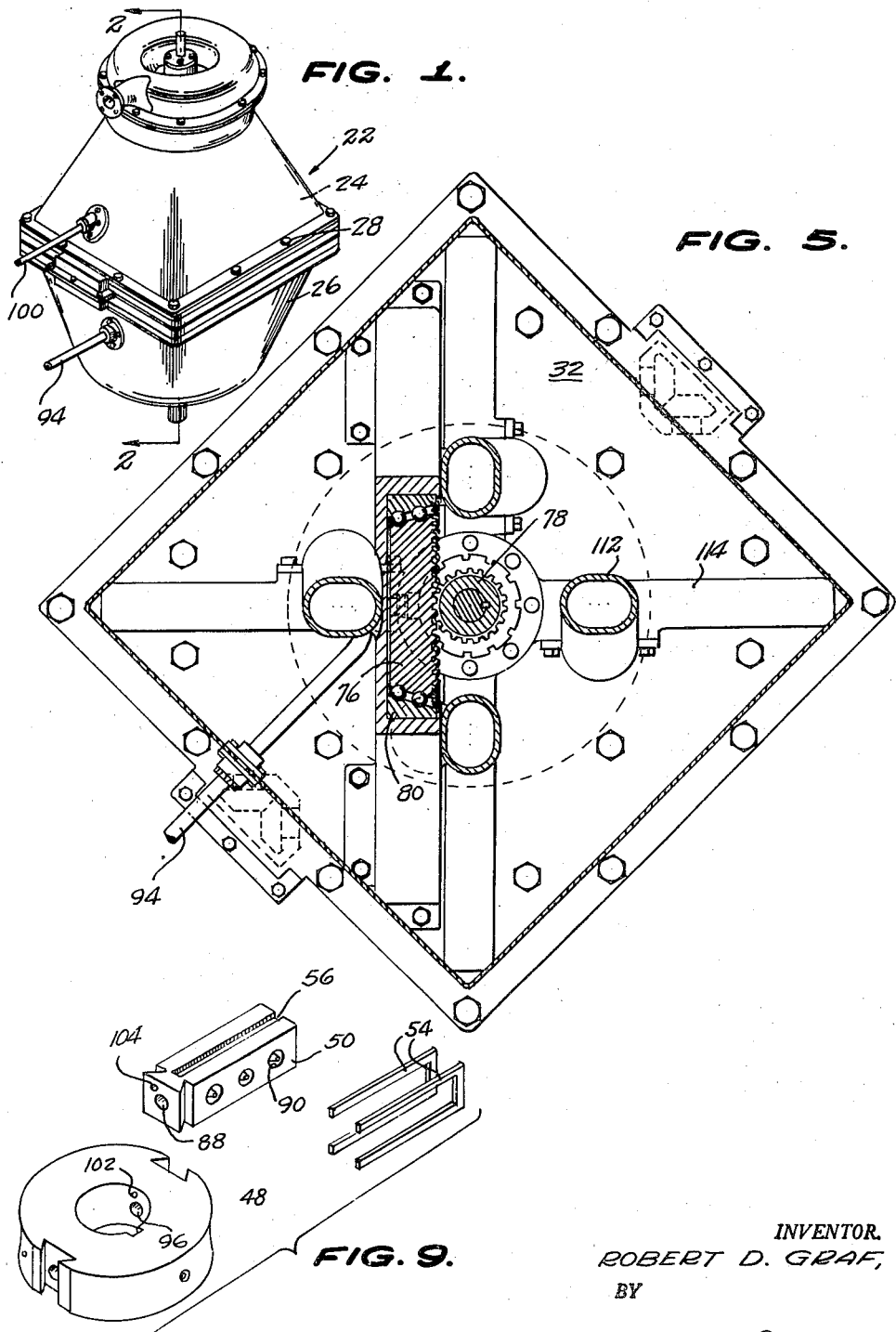
Figure 1 is an isometric view of the rotary internal combustion engine according to the present invention.

Referring in greater detail to the drawings in which like numerals indicate like parts throughout the several views, the rotary internal combustion engine according to the present invention comprises a housing 22 having an upper section 24 and a lower section 26 joined together by bolts 28. A casing 30 is positioned within the housing 22 and has two sections, an upper section 32 and a lower section 34. The perimeters of the upper and lower sections 32 and 34 of the casing 30 are provided with outwardly extending flanges as at 36 in Figure 2 secured between the adjacent portions of the upper and lower sections, 24 and 26, of the housing 22.

An upper plate member 38 is arranged in face to face abutting relation with respect to a lower plate member 40 and the members 38 and 40 are positioned between the upper and lower casing sections 32 and 34 and extend completely to the perimeters of the casing sections.

Figure 4:
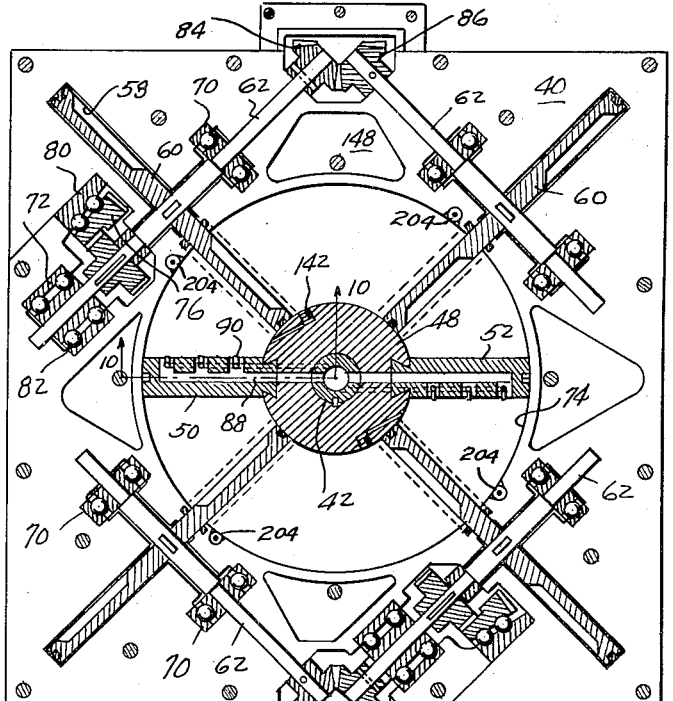
Figure 4 is a sectional view, taken on the line 4—4 of Figure 3.
Figure 10:
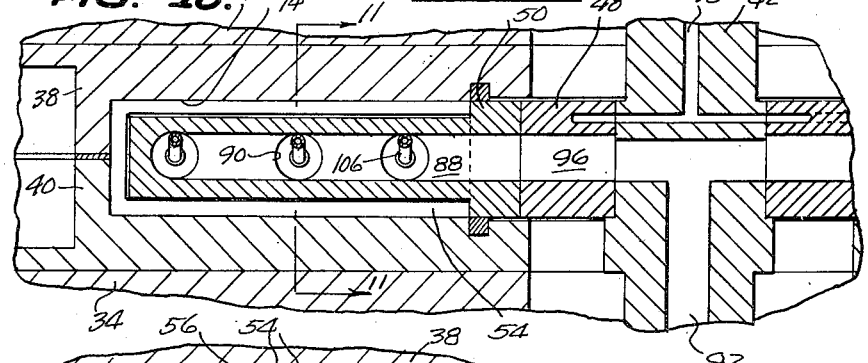
Figure 10 is a sectional view, on an enlarged scale, taken on the line 10—10 of Figure 4.

In Figure 4, the lower plate member 40 is shown in plan view while in the sectional view of Figure 5, the upper surface of the upper casing section 32 is shown in plan view. A vertically disposed driven shaft 42 extends through the casing 30 and housing 22 and has portions adjacent its ends journaled in the housing 22, there being bearing assemblies 44 supporting the shaft 42 in the upper end of the upper section 24 of the housing 22 and other bearing assemblies 46 supporting the shaft 42 in the lower housing section 26.

A horizontally disposed hub 48 is circumposed above the intermediate portion of the driven shaft 42 and is fixedly secured to the driven shaft 42 for rotation therewith.

A pair of rotor blades 50 and 52 project in opposed relation from and are keyed to the hub 48, as shown in Figure 4. The assembly of one blade 50 to the hub 48 is shown in exploded view in Figure 9 in which sealing elements, U-shape in form and designated by the reference numeral 54, are shown removed from the single groove 56 in the blade 50 in which, when seated therein, they form a split piston ring.

The plate members 38 and 40 are provided with slotted openings 58 arranged radially about the shaft 42 through which extend, one in each opening, vertically disposed discs 60. Each disc 60 has a stub shaft 62 extending through it and to which it is secured at the disc midpoint for rotation with the stub shaft 62. Each of the discs is positioned adjacent the space on the side of the adjacent blade 50 or 52 and with a portion of such disc 60 between the periphery of the disc 60 and its midpoint extending into the adjacent space between the blades 50 and 52 with the periphery of the disc 60 contiguous to the hub 48.

Each of the discs 60 has a slot 64 extending inwardly from the periphery to a point adjacent the midpoint of the disc 60 for passage therethrough of the blades 50 and 52 upon rotation of the driven shaft 42. One of the discs 60 is shown in exploded view in Figure 8 in which a sealing member 66 is shown removed from its groove 68 in a half portion of the periphery of the disc 60.

Each of the stub shafts 62 is mounted in suitable bearing blocks, either single bearing blocks 70, or in a single bearing block 70 and a double bearing block 72, as shown in Figure 4. Means is provided connecting each of the stub shafts 62 to the driven shaft 42 for rotation of the stub shafts 62 so as to bring the slot 64 of the disc 60 into registry with the blades 50 and 52 as the latter are rotated in the space between portions of the plate members 38 and 40, such space constituting a combustion chamber and designated by the reference numeral 74. Specifically, this connecting means consists in a vertically disposed ring gear 76 having internal threads (Fig. 2) enmeshed with a pinion gear 78 keyed to the portion of the driven shaft 42 inwardly of the upper end of the housing section 22. The ring gear 76 is shown in Figure 4 to be supported in a ring bearing member 80 for rotation therein with a pinion gear secured to the adjacent stub shaft 62 and enmeshed with the teeth of the ring gear 76, as shown in Figure 4, only two of the stub shafts 62 directly connected by the pinion gear 82 to the ring gear 76, the other two stub shafts 62 being connected by means of bevel gears 84 and 86 to the adjacent other stub shaft 62.

In the first form of the invention, the discs 60 each have two slots 64 and the gearing connection of the stub shafts 62 to the driven shaft 42 is such that one of the slots 64 in each disc 60 in in registry with the approaching blade 50 or 52 when such blade has been brought to a position proximate to the respective disc 60.

Each of the blades 50 and 52 is provided with a longitudinally extending passageway 88 and a discharge port 90 extending from the passageway 88 and opening out of one face of the respective blades 50 or 52.

Means is provided for conveying air under pressure through the driven shaft 42 and the hub 48 and through the passageway 88 and ejecting the same through the blade discharge port 90. This means consists in a passageway 92 in the shaft 42 having one end connected in communication with a speed conduit 94 (Fig. 3), the hub having a transverse passage 96 connecting in communication with the other end of the passageway 92, and connected in communication with the passageway 88 in the blades 50 and 52, respectively.

Figure 11:
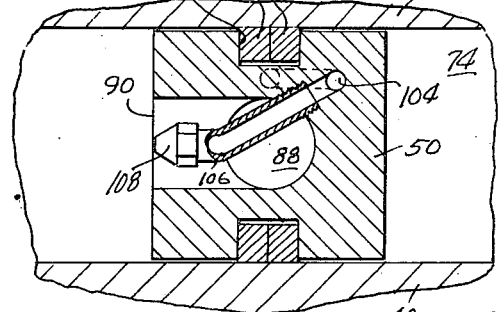
Figure 11 is a sectional view, taken on the line 11—11 of Figure 10.
Figure 6:
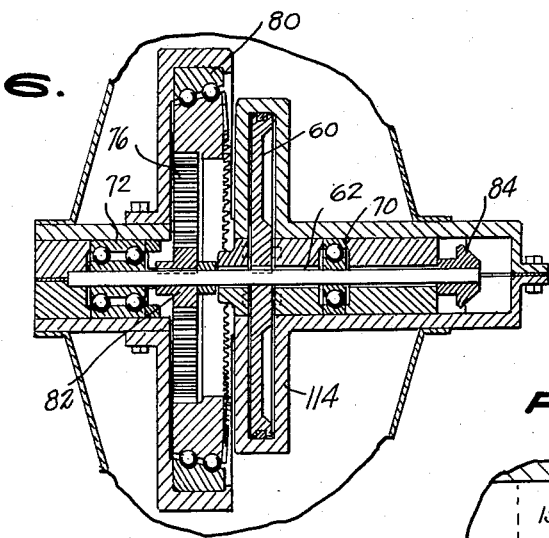
Figure 6 is a sectional view, on an enlarged scale, taken on the line 6—6 of Figure 2.

Means is also provided for conveying fuel under pressure through the driven shaft 42, through the hub 48, and through the passageway 88 in each of the blades 50 and 52 and ejecting the fuel through the discharge ports 90 in such blades in admixture with the air received through the passageway 88. Specifically, this means includes another passageway 98 provided in the shaft 42 and having one end connected in communication with a second conduit 100 and the other end connected with another passage 102 in the hub and a passageway 104 in each of the blades 50 and 52. As shown most clearly in Figure 11, the passageway 104 in the blade 50 or 52 is provided with a short length of pipe 106 in each of the discharge ports 90, the pipe 106 ending in a spray nozzle 108 for spraying fuel into the space adjacent the one face of the blade 50 or 52.

The conduits 94 and 100 are adapted to be connected to air and fuel pumps, respectively, either driven by the driven shaft 42 or by an external source of power.

Figure 2:
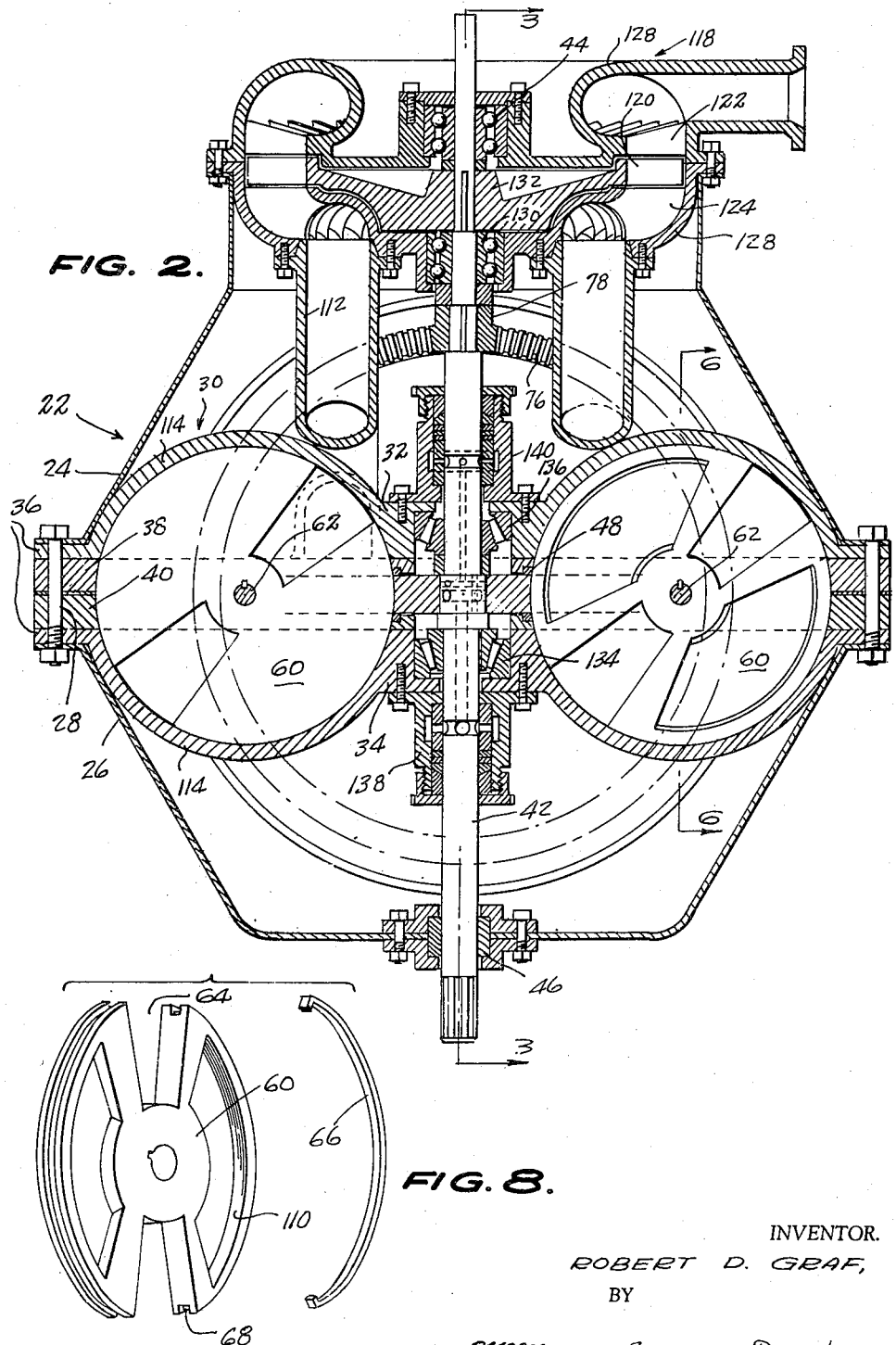
Figure 2 is a sectional view, on an enlarged scale, taken on the line 2—2 of Figure 1.
Figure 7:
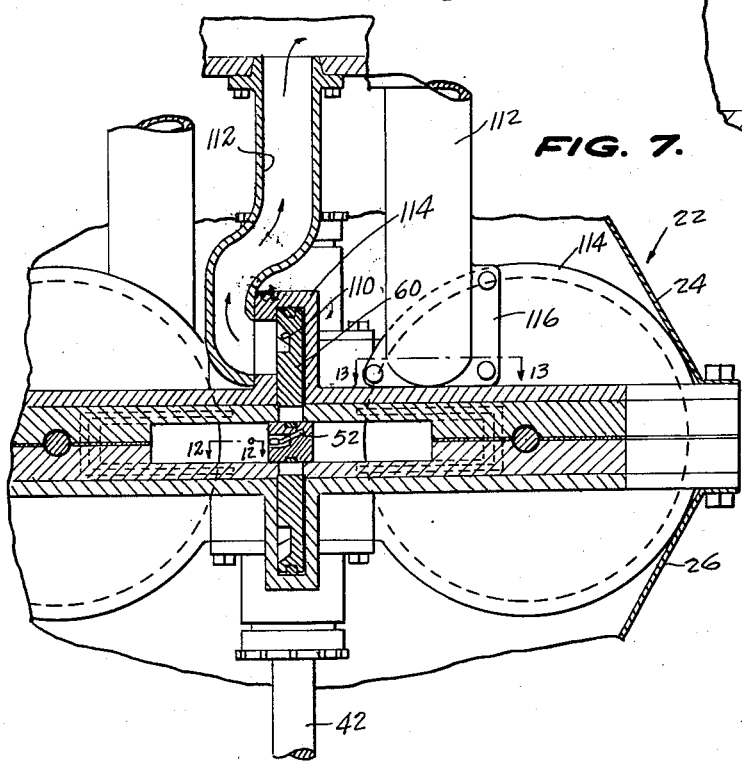
Figure 7 is a sectional view, taken on the line 7—7 of Figure 3.
Figure 13:
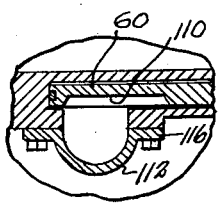
Figure 13 is a sectional view taken on the line 13—13 of Figure 7.
Figure 16:
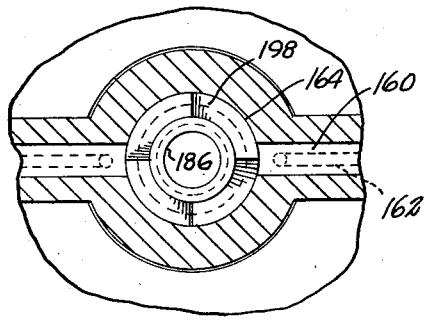
Figure 16 is a sectional view taken on the line 16—16 of Figure 15.
Figure 17:
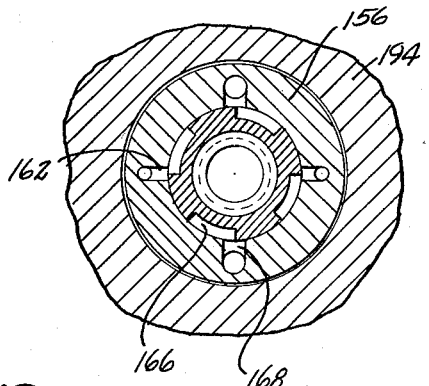
Figure 17 is a sectional view, taken on the line 17—17 of Figure 15.
Figure 18:
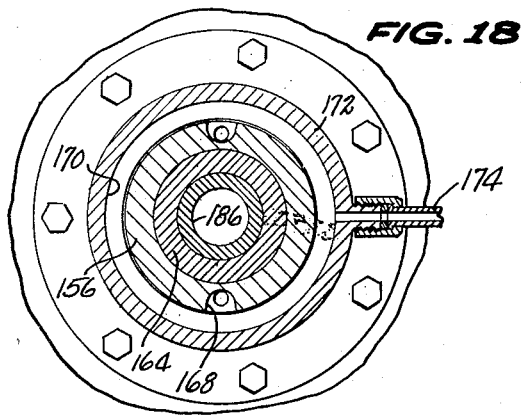
Figure 18 is a sectional view, taken on the line 18—18 of Figure 15.
Figure 19:
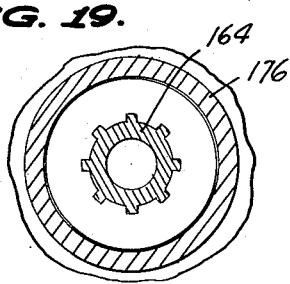
Figure 19 is a sectional view, taken on the line 19—19 of Figure 15.

Exhaust means is provided in communication with the face of each of the discs 60 remote from the discharge port face of the blades 50 and 52. As shown in Figure 8, this means consists in a recess 110 provided in the face of the disc 60, permitting escape of the exhaust gases, as seen in Figure 7, upwardly through an exhaust conduit 112 having its lower end connected in communication with the hollow semicircular housing 114 provided in each of the upper and lower casing sections 32 and 34, as shown in Figures 2 and 5. In Figures 7 and 13, it will be seen that the exhaust conduit 112 has a flange 116 at its lower end for securing it over an opening provided in the housing 114.

Figure 3:
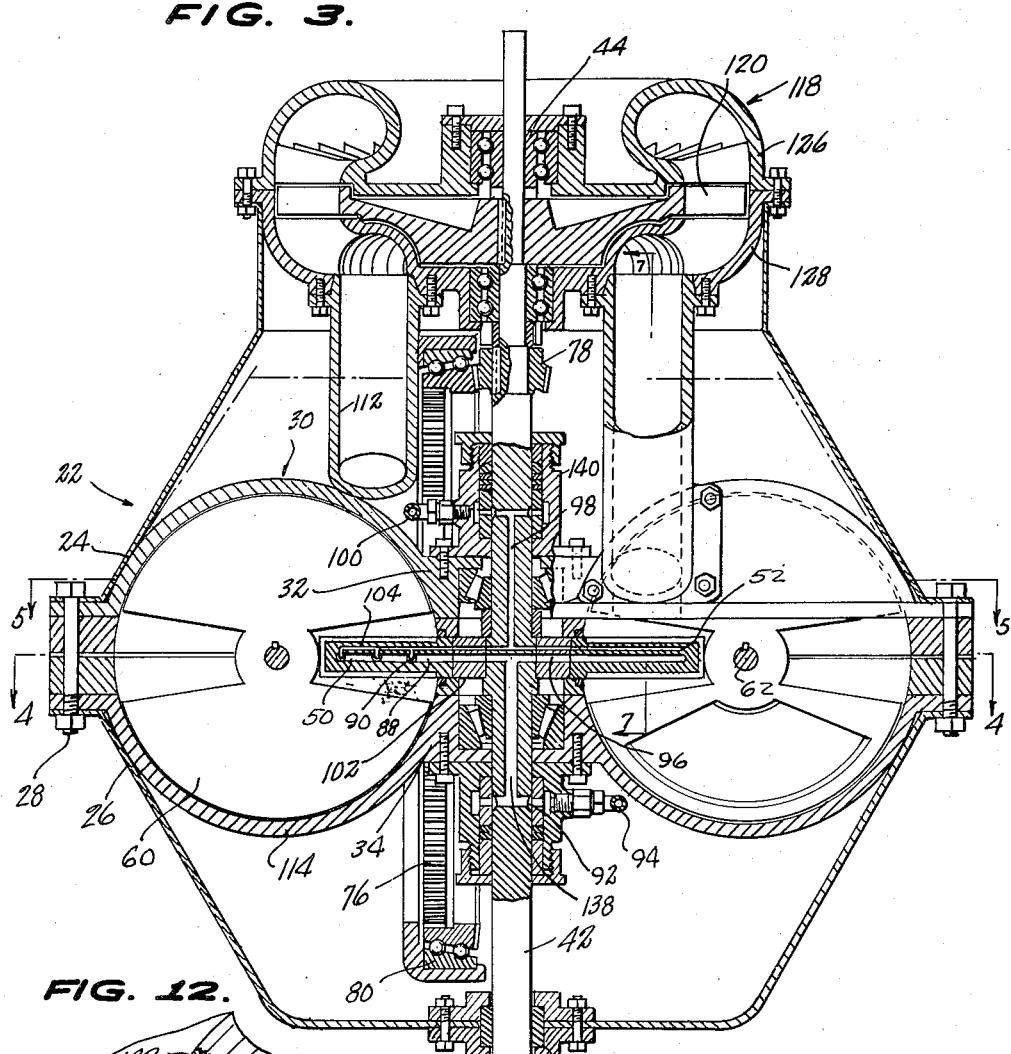
Figure 3 is a sectional view taken on the line 3—3 of Figure 2.
Figure 12:
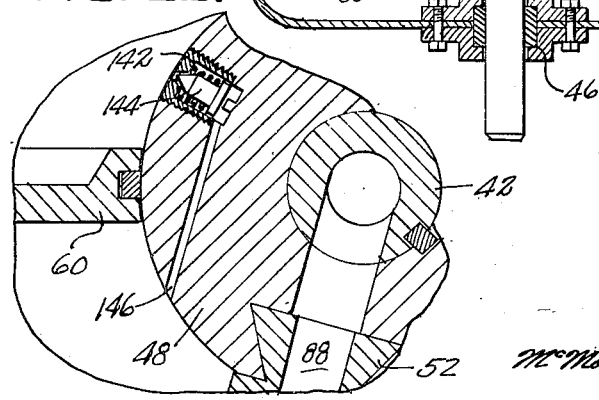
Figure 12 is a sectional view, on an enlarged scale, taken on the line 12—12 of Figure 7.

In Figures 2 and 3, it will be seen that each of the exhaust conduits 112 has its upper end in communication with the inlet side of a turbine assembly 118 having blades 120 fixedly mounted upon the upper end portion of the driven shaft 42. The assembly 118 includes stator blades 122 and 124 on each side of the turbine blades 120 and fixedly mounted in casing half sections 126 and 128, respectively. Another bearing assembly 130 is interposed between the pinion gear 78 and the rotor 132 of the turbine assembly 118 and serves to support the portion of the shaft 42 mounting the turbine assembly 118.

The intermediate portion of the shaft 42 is supported in opposed bearing assemblies 134 and 136 and packing gland assemblies 138 and 140 are secured to the casing lower section 34 and upper section 32, respectively, and seal the shaft 42 in the area of the connection of the conduits 94 and 100 to the passageways 92 and 98, respectively, in the shaft 42.

An aperture plug 142 is provided in the hub 48 and supports therein a spring-biased check valve 144 which permits passage of gases through a bleed passage 146 in one direction and prevents the passage of such gases in the other direction.

It is intended that the space between the inner wall of the housing 22 and the casing 30 be filled with cooling fluid and for this purpose the upper and lower plate members 38 and 40 are provided with registering apertures as at 148 in Figure 4 for the circulation of cooling water therethrough.

Figure 14:
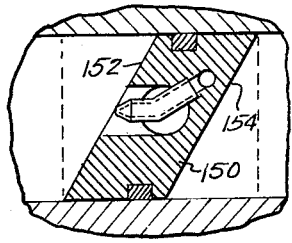
Figure 14 is a sectional view of a modified form of the rotor blade.

In Figure 14, a modified form of the rotor blade is shown at 150 with an upwardly sloping discharge port face 152 and an opposite face 154 sloping downwardly. With this type of blade, the opening in the associated disc may be reduced in area and the closing of the space behind the blade 150 will be closed by the associated disc more quickly and more efficiently.

Referring to Figure 15, a modified form of the driven shaft 42 is shown at 156 and carrying on its lower end a combined hub and blade assembly 158 having passageways 160 and 162 therein for the passage of combustion air and combustion fuel, respectively. The lower end of the shaft 156 is open and extending upwardly into the lower end of such shaft is a sleeve 164 having a reduced portion 166 adjacent its upper end providing a passage for fuel to the passageway 162, there being provided a longitudinally extending groove, shown in dotted lines in Figure 15, designated by the reference numeral 168 and on the inner face of the adjacent portion of the blade and hub assembly 158. The lower end of the groove 168 is connected in communication with an annular recess 170 provided in the gland member 172 circumposed about the lower end portion of the shaft 156. The recess 170 is connected by a conduit 174 to a source of fuel under pressure. The lower end portion of the sleeve 164 is seated within an open top cup 176 having its bottom connected in communication with a conduit 178 leading to a source of control hydraulic fluid under pressure. A flange 180, having sealing means between its end and the adjacent portion of the cup 176, projects from the lower end portion of the sleeve 164 and serves as a stop for one end of a spring 182, the other end of which bears against the lower end portion of a bearing 184. The other portion of the bearing 184 abuts the lower end portion of the shaft 156. A hollow post 186 rises from the shell 188 of the modified invention and extends upwardly within the sleeve 164 to a point mid-length of the latter. Conduit means, as at 190, connects the open lower end of the post 186 with the interior of the rotor blade and hub assembly 158 and specifically with the passageway 160 for conveying air under pressure from a pump or other means to the passageway 160 and thence for discharge into the combustion chamber formed between the casing half sections 192 and 194.

Figures 20, 21:
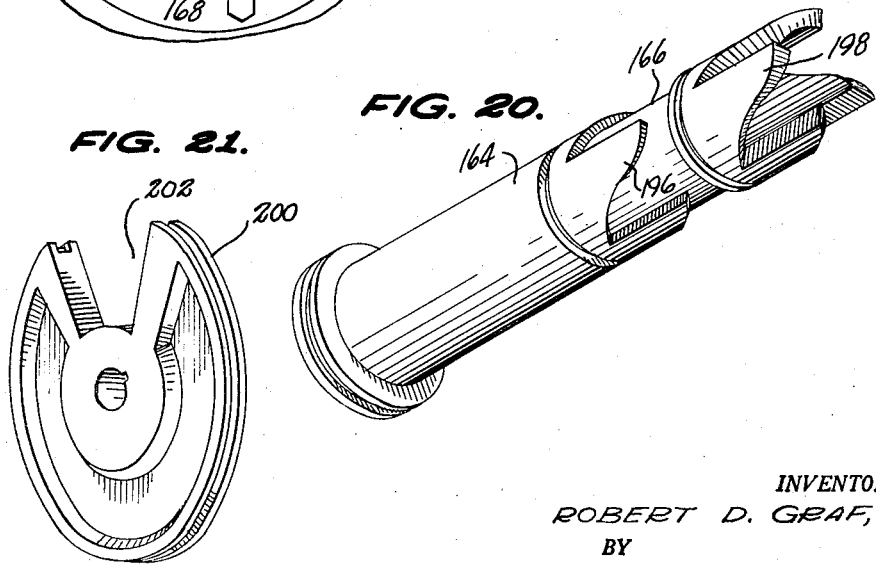
Figure 20 is an isometric view of one of the components of the fuel metering system.
Figure 21 is an isometric view of a modified form of the valve used in the engine according to the present invention.

As shown in Figure 20, the sleeve 164 is formed with arcuately curved castellations 196 and 198 which serve to meter the fuel and air, respectively, supplied through the conduit 174 and the conduit means 190, respectively. Upon the application of hydraulic fluid pressure through the conduit 178, the flanged portion of the sleeve 164 moves upwardly against the biasing of the spring 182 to shift the castellations 196 and 198 to partially or completely close connection between the groove 168 and the adjacent portion of the passageway 162 and also to close the interior of the sleeve 164 and post 186 from the air passageway 160. It is seen, therefore, that this modified form of the invention provides a means for accurately and efficiently controlling the supply of fuel and air to the combustion chamber of this form of the engine of the present invention.

In Figure 21 is shown a modified form of the valve disc in which the disc 200 is provided with only a single slot 202.

In operation, the rotary internal combustion engine of the present invention, in each of its illustrated forms, is supplied with a suitable fuel and air under pressure through the passageways in the shaft, hub, and rotor blades and ejected through the discharge port of such blades into the space adjacent one face of the blades. The fuel mixture within the combustion chamber thus formed by the adjacent face of the rotor blades and the one face of the associated disc is ignited by suitable means, such as a glow plug 204 shown in Figure 4, carried in the adjacent portion of the casing. Upon burning of the fuel and air mixture, the blade will be forced away from the associated disc and will effect the rotation of the associated shaft. As each blade is rotated through the combustion chamber, it approaches the next adjacent disc and when it is in a position proximate to such disc, the disc will reach a position in its rotational movement in which the slot is in registry with the approaching blade. The blade will pass through the disc in the slot and immediately the disc will have rotated to present its solid face to the blade and to form therewith, in the adjacent part of the casing, another combustion chamber for repeated firing or combustion of the air and fuel admixture supplied thereto. The exhaust gases of each combustion chamber will flow through the side of the disc remote from the blades and upwardly through the turbine assembly which will be driven by such gases and add to the torque and power of the associated driven shaft.

It will be seen, therefore, that the rotary internal combustion engine according to the present invention will produce power in a smooth vibrationless manner and with a virtually continuously variable torque from starting to high speed without the necessity of employing transmission or torque converters.

While only preferred embodiments of the present invention have been heretofore described and illustrated in the annexed drawings, numerous modifications and changes may be made therein without departing from the spirit of the invention as set forth in the appended claims.

What is claimed is:

1. In an internal combustion engine, a vertically disposed driven shaft, a horizontally disposed hub circumposed about the intermediate portion of and connected to said shaft for rotation therewith, opposed blades projecting from said hub, a vertically disposed disc positioned so that a portion between the periphery and the midpoint extends into each of the spaces on opposite sides of said blades with the periphery contiguous to said hub, said disc having a slot extending inwardly from the periphery to a point adjacent its midpoint for passage therethrough of said blades upon rotation of said driven shaft, a rotatable stub shaft extending through and secured to the midpoint of said disc, means connecting said stub shafts to said driven shaft for rotation of said stub shafts so as to bring the slot of said disc in registry with the blades when rotation of said driven shaft has brought the respective blades to positions proximate to said disc, each of said blades being provided with a longitudinally extending passageway and a discharge port extending from said passageway and opening out of one face of said blade, means for conveying a combustible fuel-air mixture through said passageway and ejecting said mixture out of said discharge ports, and an exhaust means in communication with the face of said disc remote from the discharge port face of said blades for withdrawing the combustion gases.

2. In an internal combustion engine, a vertically disposed driven shaft, a horizontally disposed hub circumposed about the intermediate portion of and connected to said shaft for rotation therewith, opposed blades projecting from said hub, a vertically disposed disc positioned so that a portion between the periphery and the midpoint extends into each of the spaces on opposite sides of said blades with the periphery contiguous to said hub, said disc having a slot extending inwardly from the periphery to a point adjacent its midpoint for passage therethrough of said blades upon rotation of said driven shaft, a rotatable stub shaft extending through and secured to the midpoint of said disc, means connecting said stub shafts to said driven shaft for rotation of said stub shafts so as to bring the slot of said disc into registry with the blades when rotation of said driven shaft has brought the respective blades to positions proximate to said disc, each of said blades being provided with a longitudinally extending passageway and a discharge port extending from said passageway and opening out of one face of said blade, means for conveying a combustible fuel-air mixture through said passageway and ejecting said mixture out of said discharge ports, said disc having in the face remote from the discharge port face of said blades a recess, and an exhaust conduit in communication with the recess of said disc for withdrawing the combustion gases.

3. In an internal combustion engine, a vertically disposed driven shaft, a horizontally disposed hub circumposed about the intermediate portion of and connected to said shaft for rotation therewith, a pair of blades projecting in opposed relation from said hub, at least two vertically disposed discs disposed adjacent each of the spaces on opposite sides of said blades, each disc being positioned so that a portion between the periphery and the midpoint extends into the adjacent space with the periphery contiguous to said hub, each of said discs having a slot extending inwardly from the periphery to a point adjacent its midpoint for passage therethrough of said blades upon rotation of said driven shaft, a rotatable stub shaft extending through and secured to the midpoint of each of said discs, means connecting said stub shafts to said driven shaft for rotation of said stub shafts so as to bring the slots of said discs in registry with the blades when rotation of said driven shaft has brought the respective blades to positions proximate to said discs, each of said blades being provided with a longitudinally extending passageway and a discharge port extending from said passageway and opening out of one face of said blade, means for conveying a combustible fuel-air mixture through said passageway and ejecting said mixture out of said discharge ports, and an exhaust means in communication with the face of each of said discs remote from the discharge port face of said blades for withdrawing the combustion gases.

4. In an internal combustion engine, a vertically disposed driven shaft, a horizontally disposed hub circumposed about the intermediate portion of and connected to said shaft for rotation therewith, a pair of blades projecting in opposed relation from said hub, at least two vertically disposed discs disposed adjacent each of the spaces on opposite sides of said blades, said discs being positioned so that a portion between the periphery and the midpoint extends into the adjacent space with the periphery contiguous to said hub, each of said discs having a slot extending inwardly from the periphery to a point adjacent its midpoint for passage therethrough of said blades upon rotation of said driven shaft, a rotatable stub shaft extending through and secured to the midpoint of each of said discs, means connecting said stub shafts to said driven shaft for rotation of said stub shafts so as to bring the slots of said discs into registry with the blades when rotation of said driven shaft has brought the respective blades to positions proximate to said discs, each of said blades being provided with a longitudinally extending passageway and a discharge port extending from said passageway and opening out of one face of said blade, means for conveying air under pressure through said driven shaft, said hub, said blade passageways and ejecting same through said blade discharge ports, means for conveying fuel under pressure through said driven shaft, said hub, said blade passageways and ejecting same through said discharge ports in admixture with said air, and an exhaust conduit in communication with the face of each of said discs remote from the discharge port face of said blades for withdrawing the combustion gases.

No references cited.